United States Patent Office 3,438,499
Patented Apr. 15, 1969

3,438,499
VESSEL FOR AEROBIC DIGESTION SEWAGE TREATMENT PLANT
Donald J. Reckers, Cincinnati, Ohio, assignor to Pollution Controls, Inc., Cincinnati, Ohio, a corporation of Ohio
Filed Dec. 26, 1967, Ser. No. 693,520
Int. Cl. C02c 5/04, 1/12, 1/10
U.S. Cl. 210—199          16 Claims

ABSTRACT OF THE DISCLOSURE

The aerobic digestion vessel of a sewage treatment plant is contoured interiorly to promote rapid sewage circulation without deposit of solids; and baffle means provided interiorly of the vessel serve simultaneously to (1) control sewage circulation and retention, (2) to structurally reinforce the vessel internally rather than externally, and (3) to reduce the total external area of the vessel exposed to underground chemical action. The external contour of the vessel aided by internal reinforcement, assures a proper distribution of load, stress, and strain, during handling, transport, and final placement of the vessel, and subsequent burial in an excavation. Improved structural advancements in shaping and reinforcing the aerobic digestion vessel of the plant result in greater operating efficiency, lower costs of manufacture, transport, installation and maintenance, and a longer service life.

---

This invention relates to improvements in a vessel for use in an aerobic digestion sewage treatment plant, such as may be employed in the treatment of sewage in substantial volume, for example, in amounts that might be expected to originate at a school, office building, shopping center, or dwelling complex. Such a plant generally will employ a digestion tank or vessel of substantial size, in which sewage is to be aerated for an extended period of time before release of a clear unobjectionable effluent to be disposed of conventionally, as by way of a storm sewer, drainage ditch, a natural ravine, or other watercourse.

Aeration vessels for use in the aerobic system may be required to retain sewage in great quantity, such as for example, 50,000 or more gallons. A typical vessel may measure seventy feet in length, twelve feet in width, and ten feet in height, approximately, and will weigh many tons. They are usually fabricated of one-fourth inch welded steel plate with welded reinforcing, and may contain aerating pipe and nozzles, screens, baffles, and other accessories. Accompanying the aeration vessel is a clarifier, usually applied at the discharge end of the vessel, and designed to collect and recirculate sludge and to accumlate and finally release effluent in a condition satisfying accepted health standards.

For reasons of economy and convenience, the aeration vessel preferably is factory-assembled, and may be transported to the job site by truck. Due to the great size of the vessel, adequate reinforcement is required in order to withstand handling and transport. If transport is to be by road vehicle, the overall width of the vessel preferably is to be kept within safe road limits, usually twelve feet or less. In accordance with the present invention, the loss of vessel capacity resulting from the aforesaid width limitation, is largely compensated for by installing all structural reinforcing members internally of the vessel, rather than externally thereof, and from such internal reinforcing practice are obtained other important advantages to be recited in the statement of objects, which follow.

An object of the invention is to provide an aeration vessel for aerobic sewage plants, wherein by internal structural reinforcement of the vessel, the edges and joints of the reinforcing elements are protected from attack by chemicals in the earth in which the vessel may be buried, thereby minimizing the risk of structural failure.

Another object of the invention is to ensure, by internal structural reinforcement practice, an external vessel surface which is continuous and uninterrupted by exterior structural projections, thereby to facilitate and expedite the work of effectively applying to the vessel exterior an uninterrupted corrosion-inhibiting coating; the absence of external reinforcement members results also in a reduction of total exterior surface area to be coated; and the absence of exterior projections also facilitates transport and placement of the vessel at the job site.

A further object of the invention is to utilize internal vessel reinforcements as a means of controlling spiral circulation of the vessel contents, so that sewage entering the vessel will be induced to remain in circulation therein throughout a maximum period of retention (theoretically about 24 hours), before discharge thereof from the aeration chamber of the vessel and delivery to the clarifier.

Another object of the invention is to improve the internal contour of the aeration vessel so as to enhance the speed of spiral circulation of the vessel contents during the retention period, thereby to induce self-cleansing or scouring of the vessel walls such as will minimize sludge accumulation within the aeration chamber of the vessel.

A further object is to so shape the vessel interior, that sewage undergoing aeration will receive optimum exposure to atmosphere, with resultant additional oxygen transfer by surface aeration during the retention period, and with a minimum of loss of entrapped minuscule air bubbles.

Still another object of the invention is to so contour the vessel as to achieve maximum structural strength and integrity of the vessel, with a minimal expenditure of material, labor, and fabricating costs, and with additional savings achieved in installation due to a reduction in size of the foundation slab needed for proper support of the vessel either at grade or within a suitable excavation.

Further, it is an object of the present invention to increase the structural strength of a vessel having the aforesaid characteristics and requirements while at the same time reducing the weight thereof by at least ten percent.

Another object is to so shape the vessel that in an underground installation thereof, the backfill will perform to desirably equalize earth loads about the vessel, while at the same time applying force to oppose floatation of the vessel in the event of a partial evacuation of its contents, as during a servicing operation.

The foregoing and other objects are attained by the means described herein and illustrated upon the accompanying drawings, in which.

Figure 1:
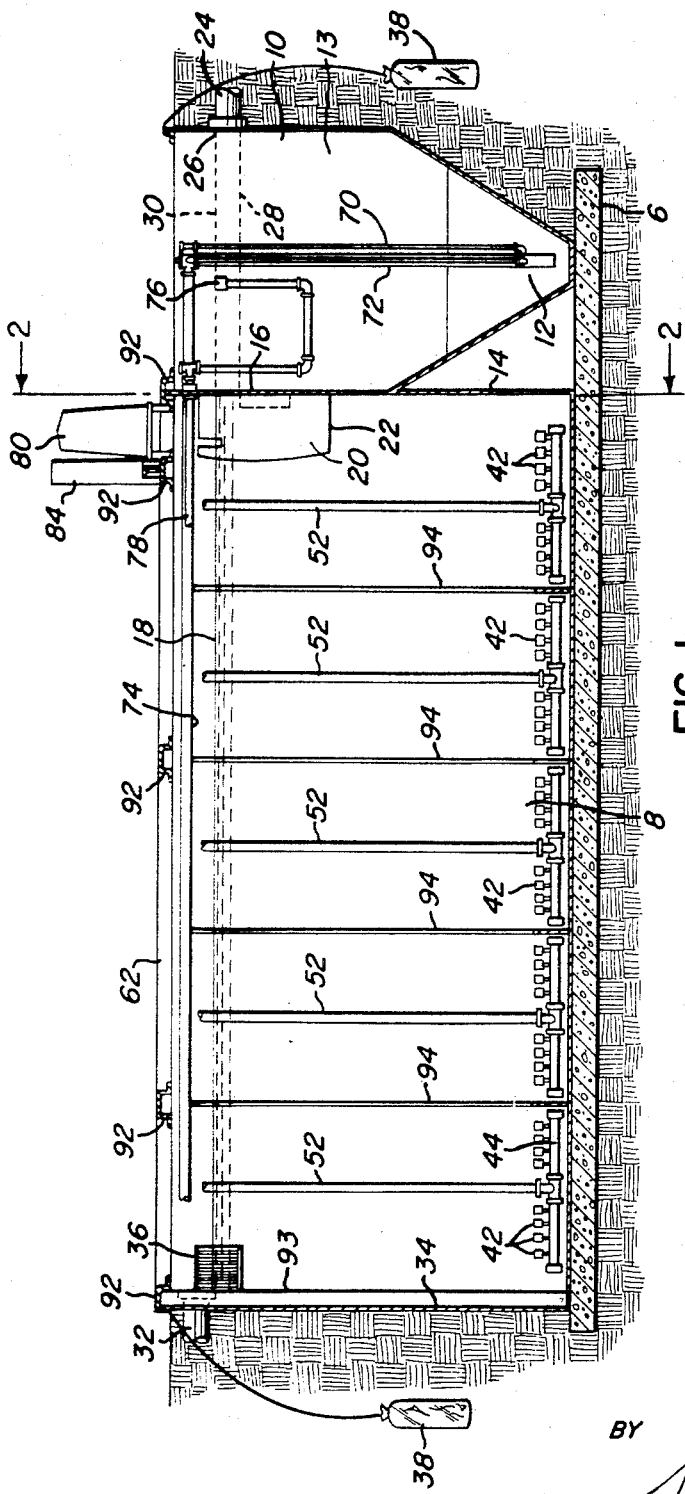
FIG. 1 is a longitudinal vertical cross-section of an aerobic digestion sewage treatment plant, comprising an aeration vessel with a clarifier at one end thereof, supported upon a concrete foundation slab within an earth excavation, and embodying the improvements of the present invention.

The drawings illustrate a horizontal concrete foundation slab 6 resting in an earth excavation, and upon which slab is supported the aerobic digestion vessel 8 and the clarifier unit 10. The clarifier unit 10 may be in the form of a box or receptacle 13 having one or more sump compartments 12 each of which may be in the form of an inverted cone or pyramid resting upon slab 6. The receptacle of the clarifier unit may be formed integrally with, or applied securely to, the end wall 14 of vessel 8. Fluid may flow from the interior of vessel 8 to the interior of receptacle 13, through a connecting port 16 formed in end wall 14, which port is located below the normal level of fluid indicated by full line 18 in FIG. 1. A baffle plate 20 fixed within vessel 8, performs to intercept any direct flow of fluid into clarifier receptacle 13 through port 16; that is, fluid seeking to enter the port 16 is required to pass under the lower edge 22 of the baffle plate, and then ascend upwardly behind the plate in order to reach port 16 and spill into the clarifier receptacle.

The primary purpose of baffle 20 is to materially reduce the velocity of any fluid seeking passage into clarifier chamber 13, and to prevent transfer of any floating material from vessel 8 to chamber 13. Thus, the fluid in clarifier chamber 13 is maintained in a state of relative quiescence, so that any solids suspended therein may settle into sump 12, leaving the liquid above the sump clean and clear for discharge from the plant through main outlet port 24. The outlet port 24 may have connection at 26 with a horizontal open-topped trough member 28 fixed within the clarifier receptacle, and having an upper horizontal edge 30 over which the clarified liquid may spill in entering the trough and then leaving the plant through outlet port 24.

Raw sewage in a fluid state enters the vessel 8 through inlet port 32 located preferably in end wall 34, at or above the normal fluid level indicated at 18. The numeral 36 indicates a coarse screen or grating to catch undigestable large articles such as rags, plastic objects or the like, which may be removed from the screen at times through the open top of vessel 8, to keep the screen clear of such trash. The numerals 38 indicate bags of chemicals buried with the vessel and connected thereto so as to provide cathodic protection against corrosion, this being common practice in the industry.

Figure 2:
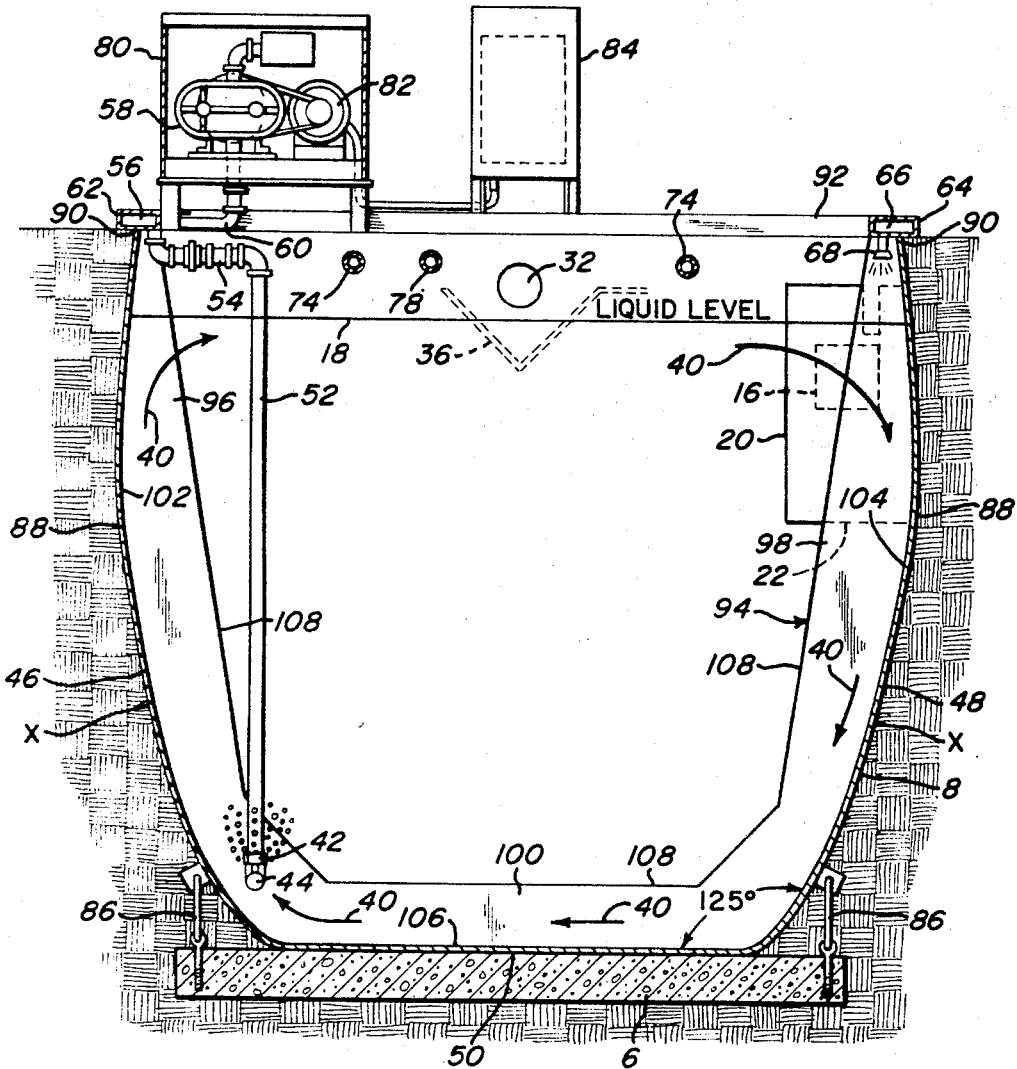
FIG. 2 is an enlarged transverse cross-section taken on line 2—2 of FIG. 1.

Referring to FIG. 2, the several arrows 40 indicate the direction of circulation of sewage within vessel 8 promoted by the upward release of air bubbles through the multiplicity of nozzles 42 located near a side wall of the vessel, and submerged well below the normal level of liquid within the vessel. The air nozzle 42 may be spaced from one another along a distributor pipe 44 which extends substantially from end wall 34 to end wall 14 of vessel 8 and all of the nozzles may be equally spaced from a side wall 46 of the vessel. The vessel includes also an opposite side wall 48, and a connecting bottom wall 50 that rests upon slab 6.

Air under pressure may be supplied to nozzles 42 through a series of tubular risers 52, each of which may have a pipe connection as at 54 of FIG. 2, with a manifold 56 receiving air under pressure from a pump or blower 58. A pipe 60 may connect the blower with manifold 56. The manifold may be constituted of a hollow box beam 62 which serves as a structural reinforcing member welded along the upper edge of side wall 46. The box beam may extend the full length of vessel 8, and if desired, may embrace also the receptacle 13 of the clarifier. Similarly, a second hollow box beam 64 may reinforce the upper edge of vessel side wall 48 and a wall of receptacle 13 adjacent thereto. The manifold 66 provided by box beam 64, may supply water under pressure to a line of nozzles 68 for directing sprays of water downwardly along wall 48 onto the sewage, this being for the purpose of knocking down floating foam or froth carried toward side wall 48 by circulation of fluid within the vessel. Froth control nozzles such as 68 may be spaced apart at intervals along the length of manifold 66, which manifold may be coextensive with the length of vessel 8.

Water under pressure may be supplied to manifold 66 by means of a suitable pump 70 arranged to draw water from the clarifier receptacle 13. Pump 70 is shown by way of example as an airlift or jet-type pump. Another pump 72 of the same type may be employed to lift sludge or sediment periodically from the sump 12 of the clarifier, and return it to vessel 8, by way of one or more pipes 74, for further aeration. The pumps 70 and 72 may be operated by air pressure supplied by blower 58.

Within the clarifier receptacle is shown a scum collector or skimmer 76 of conventional design, for returning scum or froth to the aeration vessel 8 through a pipe 78.

A weather-proof housing 80 provides protective cover for blower 58 and its drive motor 82, and within a second housing 84 may be installed timing mechanisms, sensing devices, and other equipment for controlling operation of the plant automatically. At 86 in FIG. 2 are indicated connecting means for anchoring the aeration vessel upon the buried slab 6. It may here be noted that slab 6 in certain installations may be located at grade, rather than underground, if desired.

The contour and the reinforcing of aeration vessel 8 are matters of primary importance to the present invention. In the transverse cross-section, FIG. 2, the width dimension of the vessel bottom wall 50 is seen to be less than the width dimension of the open top of the vessel; however, between the open top and the bottom, the vessel side walls each bulge outwardly on a curvature to form a belly at 88, 88, which projects outwardly beyond the upper longitudinal edge 90 of the side wall. At the point of maximum projection of belly 88, each side wall of the vessel curves inwardly and downwardly toward bottom wall 50 to a point X, which point X is located above the bottom wall 50 at a distance equal to about one-third the height of the vessel. The bulge or belly curvature between X and 90 is a circle arc produced on a radius of 15.5 feet, the center of the circle being on a horizontal line that passes through the points of maximum outward projection of the side walls 46 and 48, at the locations 88, 88. The locations 88, 88 are at an elevation above the bottom wall 50, approximately equal to two-thirds the height of the vessel.

From the point X downwardly, the side wall curves inwardly on a progressively tighter curvature until it meets the bottom wall 50 on a short radius as shown. The side wall curvature between the point X and the point of intersection of the side wall with bottom wall 50, may be substantially parabolic of form, meeting the plane of the bottom wall at a mean interior angle of about 125°. It will be understood that both side walls 46 and 48 bear the same curvature characteristics, and the same angular relationship to the bottom wall 50 of the aeration vessel. The 125° angularity above mentioned is subject to slight variation, with 2° or 3° greater or less angularity. The resultant of the earth load on the inwardly sloping wall area between 90 and 88, plus the weight of the vessel, requires that the side walls meet the bottom wall at the approximate angle recited, in order to maintain effective load distribution with minimal internal strain upon the vessel structure. In addition, the internal contour of the vessel resulting from the curvatures, dimensions, and angularities recited, are highly favorable to the operating efficiency of the plant; the velocity of sewage circulation is increased and so patterned as to promote an active scouring of the vessel bottom, which prevents the permanent settling of solids at obscure locations within the vessel. The increased circulation velocity performs also to discourage escape of minuscule air bubbles from the bottom of the sewage mass to the surface thereof, so that the air bubbles retained may have maximal oxygenating contact with the mass during circulation.

The reinforcing box beams 62 and 64 which extend lengthwise of the aeration vessel, are securely fixed to the upper edge portions 90 of the side walls 46 and 48, as by means of welds, and said box beams may extend outwardly from the edge portions 90 with an overhang approximating the vertical offset of the bulge or belly 88, amounting to about 4 inches. As previously explained herein, the box beams are fluid-tight, and serve as manifolds for supplying air and water to the nozzles 42 and 68, respectively.

At intervals along the length of box beams 62 and 64 are positioned reinforcing struts 92 which span the aeration vessel transversely across the open top thereof and impart great strength and rigidity thereto. The struts may be securely welded to the box beams and/or to adjacent portions of side walls 46 and 48, and certain ones of the struts may serve as supports for the blower and control equipment housings 80, 84, as indicated upon FIG. 1. One of several vertical end wall braces is indicated at 93.

At spaced locations along the length of side walls 46 and 48 are fixed a series of internal reinforcing struts, fins or baffles indicated generally by the numerals 94. These reinforcing members are constructed of steel plate stock, and when assembled within vessel 8 they are substantially U-shaped. The upright flat legs 96 and 98 of the baffles may be of a length substantially coextensive with the height of the vessel, and are spaced apart at their lower ends by a flat horizontal connecting portion 100. The flat faces of the parts 96, 98, 100, are in a common plane which is perpendicular to the major axis of vessel 8, and the outer edges of said parts are dimensioned and contoured in correspondency with the dimensions and contours of the vessel walls 46, 48 and 50, respectively. The outer edges 102, 104, 106 of the baffle members are secured to the inner faces of the vessel walls, preferably by means of welds, in order to structurally reinforce the vessel walls internally.

The baffle members 94 stand substantially vertically within vessel 8, and may be spaced from one another substantially equidistantly. The width dimension of each baffle section 96, 98, 100, and the thickness thereof, should be sufficient to rigidify the vessel to withstand transport and placement without damage to the vessel, and in any case the innermost edges 108 of the baffle members will be quite remote from the inner faces of the vessel walls. Consequently, the baffle members will necessarily have a profound guiding influence upon the path of circulatory flow of fluid evidenced by the arrows 40 of FIG. 2, tending to oppose flow in the direction of outlet port 16.

As sewage enters the vessel through inlet port 32, displacement in equal quantity occurs at outlet port 16, thereby to effect an offsetting or deflection of the flow induced by baffle members 94, in the direction of port 16. The resultant flow therefore establishes a spiral path leading toward outlet port 16. Due to the great capacity of vessel 8 compared to the relatively low quantity of sewage input at 32, the lead rate of the spiral flow will be minute or greatly retarded, though the velocity of the flow transversely of the vessel (indicated by arrows 40) may be quite rapid. This of course is very beneficial to aerobic digestion, as it ensures an extended period of retention of the mass within vessel 8 coupled with thorough mixing and aeration throughout an extended period of time. Furthermore, the construction prevents undesirable short-circuiting of raw sewage longitudinally of the vessel, between ports 32 and 16, which would defeat digestion and materially reduce the effectiveness of plant operation.

From the foregoing, it will be understood that the interior baffle members 94 not only provide the necessary structural reinforcement for vessel 8, but perform also the important function of aiding aerobic digestion by controlling the spiral flow of fluid within the vessel. Another important advantage resulting from internal disposition of members 94, is that of making possible a continuous smooth outer surface of minimal total area for vessel 8, which is uniformly readily receptive of coating materials for inhibiting corrosion by underground chemical reaction with the steel of the vessel. By eliminating external projections and complex joints and angles, the application of external coating materials with great effectiveness and thoroughness is assured, with the result that the useful life of the vessel is greatly extended. Vessels which embody external reinforcing, present sharp edges and joints to which coating materials afford inadequate or short-lived corrosion protection. It is highly advantageous therefore, to expose such edges and joints interiorly of the vessel, where sewage greases afford excellent corrosion inhibition continuously and with great effectiveness.

In addition to the advantages above recited, it may be noted that internal vessel reinforcement requires the use of steel in lesser quantity than would be required for reinforcing the vessel externally. Reinforcement by internal means reduces the weight of the vessel by at least 10 percent, and effects substantial savings in cost of materials, welding labor and the like.

Whereas the drawings show the reinforcing members 94 of one-piece construction by way of example, such members might as well be constituted of several steel sections fitted and assembled within vessel 8 and joined by means of welds or otherwise. The members 94 may be constructed of one-fourth inch steel plate stock, if desired. They may desirably be welded to the box beams 62 and 64, as well as to the bottom and side walls of the vessel.

As was previously mentioned herein, the use of internal structural reinforcement enables the manufacturer to achieve optimum vessel capacity, within the twelve-foot width limitation generally observed for the transportation of cargo by truck over most highways. The absence of external reinforcing members facilitates handling, transport, and installation of the equipment, and reduces the amount of labor and material required for thoroughly and carefully coating all external areas of the vessel which may be exposed to the ravages of earth chemicals and fluids. With the present construction, it is unnecessary to over-design the vessel and thereby increase the cost thereof, in order to allow for anticipated corrosion after installation.

The vessel shape is such as to utilize the vertical curvature of its walls to transmit the proportionate applied earth backfill loads both vertically along the curvature to supporting top and bottom members, and longitudinally to supporting end members. The curvature is such that it varies directly in proportion to increasing of hydrostatic and earth backfill loads which vary in proportion to depth.

What is claimed is:

1. A prefabricated aerobic digestion vessel for a sewage treatment plant, said vessel comprising an elongate substantially rectangular internally reinforced sheet metal tank having a pair of side walls, a bottom wall, and a pair of end walls, said side walls and end walls each terminating in an upper edge portion defining the open top of the tank; said tank having an inlet at one end and an outlet at the other end, a plurality of laterally spaced transverse tank rigidifying members disposed internally of the tank, each defining a plurality of flat baffle areas projecting inwardly from the side walls and bottom wall of the tank to intercept and retard flow of sewage in the direction of the tank axis, the space between said flat baffle areas providing circulatory paths of flow substantially transverse to said tank axis and providing a spiral movement of the sewage about said tank axis from the inlet end of the tank to the outlet end, and means within said paths to induce said circulatory flow.

2. The vessel as specified by claim 1, wherein the side walls of the tank are bulged outwardly at a location between the open top and the bottom wall thereof, and wherein the top opening of the tank is of greater area than the bottom wall thereof.

3. The vessel as specified by claim 2, wherein the outward bulges of the side walls of the tank are located approximately twice as far from the bottom wall, as from the open top of the tank, said bulges each characterized by gradual curvatures toward both the bottom wall and the upper edge portions aforesaid.

4. The vessel as specified by claim 3, wherein said gradual curvatures are formed on a circle arc whose radius approximates 15.5 feet, and whose center is on a line parallel to the tank bottom wall and bisecting the bulges of the side walls.

5. The vessel as specified by claim 4, wherein the tank side walls beneath the bulges meet the bottom wall of the tank at an interior angle approximating 125°, the meeting angle being filleted inside the tank with a smooth curvature.

6. The vessel as specified by claim 3, wherein said gradual curvatures are formed on a circle arc whose center is on a line parallel to the tank bottom wall and bisecting the bulges of the side walls.

7. The vessel as specified by claim 6, wherein is included a pair of elongate hollow box beams each substantially coextensive with and overhanging one of the side wall upper edge portions in fixed relation thereto, and nozzle means associated with the interior of each box beam, for directing fluids from the box beams to the interior of the tank.

8. The vessel as specified by claim 7, wherein the nozzle means of one box beam is located to discharge a fluid downwardly along one side wall of the tank near the upper edge portion thereof, and the nozzle means of the other box beam is located to discharge a fluid upwardly along the other side wall of the tank adjacent to the bottom wall thereof.

9. The vessel as specified by claim 8, wherein said one box beam carries essentially water under pressure, and said other box beam carries essentially air under pressure, for discharge into the vessel separately through the nozzle means aforesaid.

10. The vessel as specified by claim 1, wherein is included a pair of elongate hollow box beams each substantially coextensive with and overhanging one of the side wall upper edge portions in fixed relation thereto.

11. The vessel as specified by claim 10, wherein the box beams have rigid connection with said rigidifying members.

12. The vessel as specified by claim 11, wherein one box beam is adapted to convey air under pressure, and the other box beam is adapted to convey water under pressure; nozzle means associated with said one box beam and supported within the tank to release air near the bottom thereof and along one of the side walls; and a second nozzle means associated with said other box beam and supported within the tank to release water downwardly near the upper edge portion of and along the remaining side wall of the tank.

13. The vessel as specified by claim 12, wherein both of said nozzle means are adapted to discharge into the vessel at intervals along substantially the full length of the vessel.

14. The vessel as specified by claim 11, wherein each side wall of the tank intermediate the bottom wall and a box beam, bulges outwardly to a width greater than the width of the tank at the open top thereof.

15. The vessel as specified by claim 14, wherein the area of maximum bulge of each side wall is closer to the nearest box beam than to the bottom wall of the tank.

16. The vessel as specified by claim 14, wherein the tank side walls adjacent to the outward bulges meet the bottom wall of the tank at an interior angle approximating 125°, the meeting angle being smoothly curved inside the tank.

References Cited

UNITED STATES PATENTS

| 3,228,526 | 1/1966 | Ciabattari et al. | 210—221 |
| 3,236,767 | 2/1966 | Ross et al. | 210—14 |
| 3,348,687 | 10/1967 | Foster | 210—195 |

FOREIGN PATENTS

| 561,395 | 2/1933 | Germany. |
| 773,013 | 4/1957 | Great Britain. |

REUBEN FRIEDMAN, *Primary Examiner.*

J. L. DECESARE, *Assistant Examiner.*

U.S. Cl. X.R.

210—195, 220